(12) United States Patent
Saint-Ramon et al.

(10) Patent No.: US 6,416,611 B1
(45) Date of Patent: Jul. 9, 2002

(54) METHOD OF MAKING A COMPONENT CONSISTING OF A SUPPORT AND A MEMBRANE WELDED THERETO, IN PARTICULAR A PLUG FOR A STRAW, AND MEMBRANE-SUPPORT

(75) Inventors: Jean-Gérard Saint-Ramon, L'Aigle; Christian Beau, Voisins-le-Bretonneux; Bernard Houlvigue, L'Aigle, all of (FR)

(73) Assignee: IMV Technologies, L'Aigle (FR)

( * ) Notice: Subject to any disclaimer, the term of this patent is extended or adjusted under 35 U.S.C. 154(b) by 0 days.

(21) Appl. No.: 09/418,268

(22) Filed: Oct. 14, 1999

(30) Foreign Application Priority Data

Oct. 15, 1998 (FR) ............................................ 98 12948

(51) Int. Cl.$^7$ ............................ B32B 31/00; A61J 1/06; B67B 5/03
(52) U.S. Cl. ...................... 156/251; 156/252; 156/257; 156/262; 156/268; 156/261; 156/272.4; 156/308.4; 156/515; 156/530
(58) Field of Search ................................. 156/257, 268, 156/251, 272.4, 308.4, 515, 530, 262, 252, 261

(56) References Cited

U.S. PATENT DOCUMENTS

| 4,216,046 A | * | 8/1980 | Hackert | ...................... 156/252 |
| 5,230,205 A | * | 7/1993 | Hautemont | .................. 53/485 |
| 5,503,662 A | | 4/1996 | Berger | .......................... 96/108 |
| 5,749,989 A | | 5/1998 | Linman et al. | .............. 156/160 |
| 5,772,818 A | | 6/1998 | Polk, Jr. et al. | ............. 417/312 |

FOREIGN PATENT DOCUMENTS

| DE | 1 058 426 | | 5/1959 |
| EP | 0 633 126 | A1 | 1/1995 |
| EP | 0 917 863 | A1 | 5/1999 |
| FR | 995 878 | | 10/1949 |
| FR | 1274143 | | 11/1960 |
| FR | 2 421 720 | | 11/1979 |
| FR | 97 14729 | | 5/1997 |
| GB | 1 603 541 | | 11/1981 |
| GB | 1 603 542 | | 11/1981 |

* cited by examiner

*Primary Examiner*—Linda Gray

(57) ABSTRACT

A method is disclosed of making a component consisting of a substantially cylindrical support through which there is a substantially coaxial orifice and a membrane welded to one end of the cylinder substantially perpendicularly to a longitudinal axis of the support. A substantially plane membrane is welded to one end of a support substantially perpendicularly to a longitudinal axis of the support and, after cooling, the support is torn off the membrane in a direction substantially perpendicular to the plane of the membrane so that a portion of the membrane substantially corresponding to the end of the cylinder remains welded to the support. The method can be applied to making two-part stoppers for straws, in which case the membrane is microporous, hydrophobic, impervious to liquids and permeable to gases and the support is an insert made from a material chosen from an elastomer material, a thermoplastics material and a thermoplastics elastomer material.

12 Claims, 1 Drawing Sheet

METHOD OF MAKING A COMPONENT CONSISTING OF A SUPPORT AND A MEMBRANE WELDED THERETO, IN PARTICULAR A PLUG FOR A STRAW, AND MEMBRANE-SUPPORT

BACKGROUND OF THE INVENTION

1. Field of the Invention

The present invention concerns a method of making a component consisting of a support and a membrane welded thereto. The invention is more specifically concerned with a method of making a component consisting of a substantially cylindrical support through which there is a substantially coaxial orifice and a membrane welded to one end of the cylinder. The present invention also concerns a membrane-supports assembly obtained during execution of the method.

One embodiment of the invention relates, more particularly, to a method of making a plug for a straw, consisting of a substantially cylindrical insert, through which there is a substantially coaxial orifice, and a microporous hydrophobic membrane which is impervious to liquids and impermeable to gases and is welded to one end of the cylinder, and to a microporous hydrophobic membrane/inserts assembly obtained during execution of the method.

2. Description of the Prior Art

Straws for conservation of small quantities of substances, in particular biological substances, especially biological liquids, are known as "French straws" and were disclosed for the first time in French patent No. 995 878.

The straws had a three-part plug consisting of two stoppers made from a fibrous substance with between them a powder adapted to be converted on contact with a liquid into an impermeable gel or paste adhering to the wall of the tube to create a sealed stopper.

Straws with a three-part stopper developed and sold by the assignees of the applicants are entirely satisfactory. Nevertheless, very slight absorption of the liquid contained in the straw has been noted.

There are also small three-part stoppers, but this solution does not solve the problem of absorption either.

One proposed solution to the above problem is to replace the three-part stopper with a rigid plastic material or metal ball. This solution has not proved satisfactory because, although it eliminates absorption of the liquid contained in the straw, new and unacceptable problems have arisen, the stopper no longer being at all impervious to liquids.

The assignees of the applicants have developed a straw with a two-part stopper that does not suffer from the above drawbacks.

In their French patent application FR 97 14729, the assignees of the applicants describe a straw for the conservation of small quantities of substances, in particular biological substances, comprising a segment of tube having closure means inside one end thereof, characterized in that said closure means comprise a two-part stopper consisting of a microporous and hydrophobic membrane and an insert through which there is a substantially coaxial orifice. According to one feature of the above patent application, the membrane is substantially perpendicular to the longitudinal axis of a substantially cylindrical insert welded to the membrane.

SUMMARY OF THE INVENTION

The present invention proposes a method of making a stopper of the above kind comprising a substantially cylindrical insert through which there is a substantially coaxial orifice and a microporous and hydrophobic membrane which is impervious to liquids but permeable to gases welded to one end of the cylinder.

The invention is more generally concerned with making a component consisting of a substantially cylindrical support through which there is a substantially coaxial orifice and a membrane welded to one end of the cylinder and substantially perpendicular to the longitudinal axis of the support.

The present invention can be used to make two-part stoppers for straws and filter elements.

In the case of a stopper comprising an insert and a membrane welded to it, the support of the membrane is an insert and the membrane is microporous and hydrophobic, impervious to liquids and permeable to gases, and in the case of a filter element, the support is a ring and the membrane is a filter medium.

In accordance with the present invention, a substantially plane membrane is thermally welded to a support substantially perpendicularly to the longitudinal axis of the support and the support is torn off the membrane in a direction substantially perpendicular to the plane of the membrane.

The membrane is welded to the support by means of a die having a shape such that after cooling the support can be torn off the membrane.

At the time of the thermal welding, a pre-cut of the membrane is formed, enabling it to be torn without burrs.

For example, a heating electrode is used whose shape pre-cuts the membrane to enable it to be torn off without burrs.

To tear the support off, the membrane is held in place or the support is trapped by means of a stripper and traction is applied substantially perpendicularly to the plane of the membrane. In this case, a stripper plate bears on the membrane. The support is pulled off with pliers or a holding tool by applying traction substantially perpendicularly to the plane of the membrane.

One solution which avoids the use of a stripper is to use a suction plate, i.e. a plate having a plurality of orifices, connected to a vacuum pump. The membrane-supports assembly is placed on the plate and suction is applied. Tearing off is achieved under the same conditions as previously.

The membrane is welded to the support by means of a welding anvil having an electrode at one end, for example. In one embodiment of the method of the invention the electrode is rotated by an amount between a fraction of a turn and several turns, for example one half-turn, which facilitates tearing off by encouraging the onset of rupture between the membrane and the support.

The combination of welding and tearing in accordance with the invention avoids the need for punching after welding.

In practise, an assembly is first made comprising the membrane and a plurality of supports, the plane of the membrane being substantially perpendicular to the longitudinal axes of the supports.

The membrane can be a filter membrane, for example, and can be hydrophobic.

In the case of a stopper for a straw, as mentioned above, the membrane is microporous, hydrophobic, impervious to liquids and permeable to gases.

The microporous membrane used preferably has a pore diameter in the range from approximately 0.001 µm to approximately 10 μm and the diameter of the pores of the membrane is more preferably less than or equal to 0.2 μm. The membrane is made from a polymer material, for example a material chosen from high-density polyethylene (PE-HD), polyamide, nitrocellulose, polyester, phenol-formol resin (PF resin), perfluoroalkoxy resin (PFA) and fluorocarbon resin.

The polymer material of the membrane advantageously has a bubble point P greater than $6.10^5$ Pa (6 bars) at 0.2 μm.

When making a stopper for a straw, the insert is usually made of a material chosen from an elastomer material, a thermoplastics material and a thermoplastics elastomer material. The insert is advantageously made of polyethylene.

In one embodiment of the invention, the material of the insert is colored. This provides a "color code" without the need to use colored straws.

The present invention will now be described in more detail, by way of non-limiting example and with reference to the accompanying drawings, which show the making of a two-part stopper for a straw, in the form of an insert welded to a filter membrane.

BRIEF DESCRIPTION OF THE DRAWINGS

FIG. 1 shows the insert and the membrane separately.

FIG. 2 is a diagram showing the insert on the membrane and a welding anvil positioned to weld the insert to the membrane.

FIG. 3 is a diagram showing the membrane with an insert welded to it.

FIG. 4 is a diagram showing the membrane with an insert welded to it, a stripper having been placed on the membrane.

FIG. 5 is a diagram showing the insert welded to the membrane after tearing.

Figure 1:
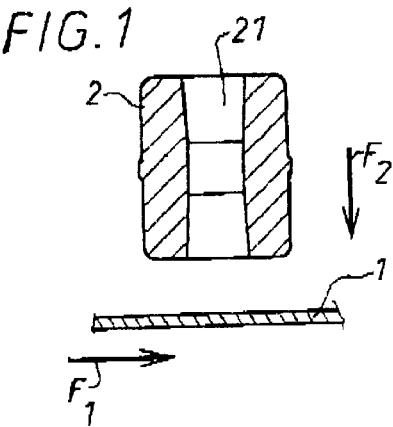
FIGS. 1 through 5 are diagrams showing the steps of one embodiment of the method in accordance with the invention of making a two-part stopper for a straw.
Figure 2:
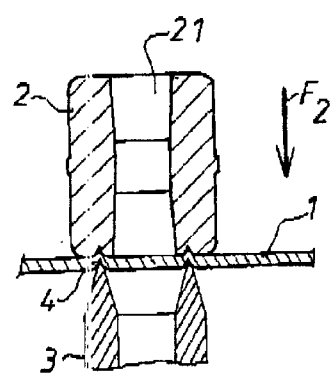
Figure 3:
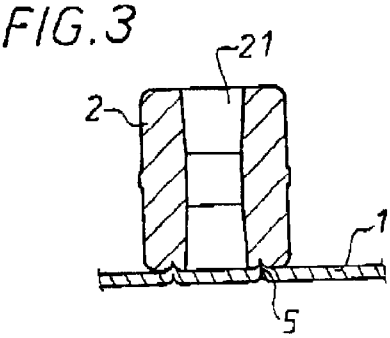
Figure 4:
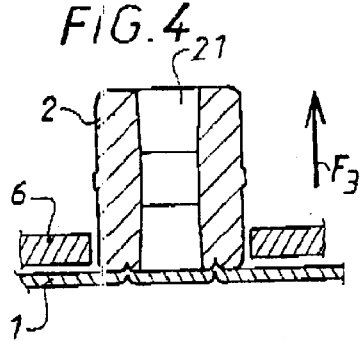
Figure 5:
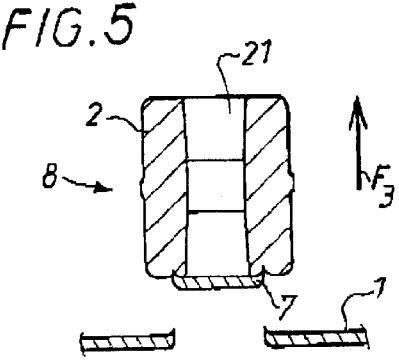
Figure 6:
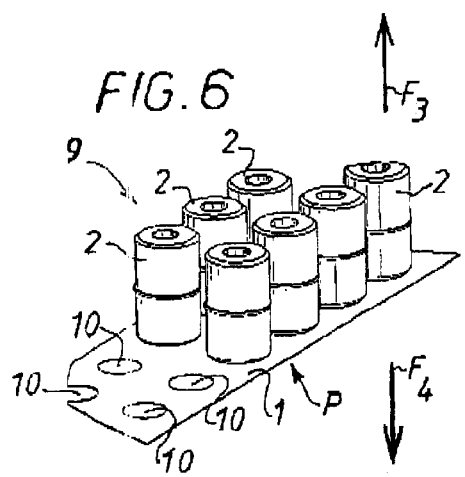
FIG. 6 shows a set of inserts welded to a substantially plane membrane substantially perpendicularly to the plane of the membrane.

For clarity, the thickness of the membrane is greatly exaggerated in the drawings.

DETAILED DESCRIPTION OF THE PREFERRED EMBODIMENT

The membrane 1 is fed from a sheet or roll in the direction of the arrow $F_1$. The insert 2, which is in the form of a cylinder with a coaxial orifice 21 through it, is placed onto the membrane 1 from above, as shown by the arrow $F_2$, and is welded to the membrane by means of the welding anvil 3 carrying an electrode 4.

The shape of the heating electrode pre-cuts the membrane to form a weakened area 5 at which tearing can easily start.

After the insert 2 is welded to the membrane 1, the combination is allowed to cool, for example by natural or forced convection.

A stripper 6 then traps the insert 2 and traction is applied substantially perpendicularly to the plane of the membrane 1. Pliers (not shown) are used to tear off the support by applying traction substantially perpendicularly to the plane of the membrane in the direction of the arrow $F_3$. The weakened area 5 ensures that the insert 2 with a portion of the membrane welded to it is torn from the remainder of the membrane 1 without burrs. The portion 7 of the membrane is welded to the insert 2 and the stopper 8 consists of the support with the membrane welded to it.

In practise, a plurality of inserts 2 are welded to the membrane 1 to constitute a membrane-inserts assembly 9. A suction plate (not shown) is placed at P and suction is applied in the direction of the arrow $F_4$. Tearing is performed as previously in the direction of the arrow $F_3$. Holes 10 are left in the membrane 1 after tearing off the plugs each consisting of a support with the membrane welded to it.

To make a stopper for a straw, the membrane is welded to the insert at a temperature in the range from 100° C. to 130° C., for example, which takes approximately one second. The contact force is in the range from a few grams to approximately 100 grams. The skilled person can easily determine the contact force required, depending in particular on the diameter of the straw.

The skilled person will obviously realize that the invention has been described and shown by way of a particular embodiment and that numerous variants can be envisaged that remain within the scope of the invention as defined by the accompanying claims.

What is claimed is:

1. A method of making a straw stopper consisting of a substantially cylindrical support through which there is a substantially coaxial orifice and a microporous and hydrophobic membrane welded to one end of said cylinder substantially perpendicularly to a longitudinal axis of said support, in which method a substantially plane membrane is thermally welded to one end of said substantially cylindrical support substantially perpendicularly to said longitudinal axis of said support and, after cooling, said support is torn off said membrane in a direction substantially perpendicular to the plane of said membrane so that a portion of said membrane substantially corresponding to said end of said cylinder remains welded to said support, in which a pre-cut of the membrane is formed at the time of said thermal welding, enabling it to be torn without burrs and in which said support is trapped by means of a stripper and traction is then applied to said membrane substantially in the direction of said longitudinal axis of said support.

2. The method claimed in claim 1 wherein said thermal welding is effected by means of a welding anvil including a heating electrode having a shape whereby said membrane is pre-cut.

3. The method claimed in claim 2 wherein said electrode is rotated about an axis substantially perpendicular to the plane of said membrane to facilitate tearing by encouraging the onset of rupture between said membrane and said support.

4. The method claimed in claim 3 wherein said rotation is in the range from a fraction of a turn to a few turns.

5. The method claimed in claim 4 wherein said rotation is one half-turn.

6. The method claimed in claim 1 wherein a plurality of supports are welded to said membrane to constitute a membrane-supports assembly before tearing off said supports.

7. A method of making a straw stopper consisting of a substantially cylindrical support through which there is a substantially coaxial orifice and a microporous and hydrophobic membrane welded to one end of said cylinder substantially perpendicularly to a longitudinal axis of said support, in which method a substantially plane membrane is thermally welded to one end of said substantially cylindrical support substantially perpendicularly to said longitudinal axis of said support and, after cooling, said support is torn off said membrane in a direction substantially perpendicular to the plane of said membrane so that portion of said membrane substantially corresponding to said end of said cylinder remains welded to said support, in which a precut of the membrane is formed at the time of said thermal welding, enabling it to be torn without burrs and in which, after a support is welded to said membrane a suction plate is placed under said membrane and suction is applied substantially in the direction of said longitudinal axis of said support before tearing is executed.

8. The method claimed in claim 7 wherein said thermal welding is effected by means of a welding anvil including a heating electrode having a shape whereby said membrane is pre-cut.

9. The method claimed in claim 8 wherein said electrode is rotated about an axis substantially perpendicular to the plane of said membrane to facilitate tearing by encouraging the onset of rupture between said membrane and said support.

10. The method claimed in claim 9 wherein said rotation is in the range from a fraction of a turn to a few turns.

11. The method claimed in claim 10 wherein said rotation is one half-turn.

12. The method claimed in claim 11 wherein a plurality of supports are welded to said membrane to constitute a membrane-supports assembly before tearing off said supports.

* * * * *